United States Patent
Bai et al.

(10) Patent No.: US 8,420,184 B2
(45) Date of Patent: Apr. 16, 2013

(54) METHOD FOR PREPARING SURFACE MODIFICATION COATING OF METAL BIPOLAR PLATES

(75) Inventors: Ching-Yuan Bai, Dasi Township, Taoyuan County (TW); Min-Sheng Wu, Miaoli (TW); Ming-Der Ger, Dasi Township, Taoyuan County (TW)

(73) Assignee: National Defense University (TW)

( * ) Notice: Subject to any disclaimer, the term of this patent is extended or adjusted under 35 U.S.C. 154(b) by 827 days.

(21) Appl. No.: 12/585,367

(22) Filed: Sep. 14, 2009

(65) Prior Publication Data

US 2010/0075063 A1    Mar. 25, 2010

(30) Foreign Application Priority Data

Sep. 22, 2008  (TW) ................................ 97136359 A (51) Int. Cl.
   *B05D 5/12*    (2006.01)
(52) U.S. Cl.
   USPC .......................................... 427/540; 427/115
(58) Field of Classification Search ............ 427/540, 427/115
   See application file for complete search history.

(56) References Cited

U.S. PATENT DOCUMENTS

| | | | |
|---|---|---|---|
| 5,733,682 A * | 3/1998 | Quadakkers et al. | 429/210 |
| 7,534,361 B2 * | 5/2009 | Akamatsu et al. | 216/14 |
| 7,968,251 B2 * | 6/2011 | Vyas et al. | 429/523 |

OTHER PUBLICATIONS

NPL-1: Puertas et al, A study on the machining parameters optimization of electrical discharge machining, J. of Materials processing technology, 143-144 (2003), pp. 521-526.*
NPL-2: Tawfik et al Metal bipolar plates for PEM fuel cell—a review, J. of power sources 163 (2007), pp. 755-767.*

* cited by examiner

*Primary Examiner* — Jie Yang
(74) *Attorney, Agent, or Firm* — Bacon & Thomas, PLLC (57) ABSTRACT

A method for preparing a surface modification coating of metal bipolar plates is disclosed, which comprises the following steps: providing a substrate; pre-treating the substrate by processing the substrate, depositing a Ni-layer on the substrate, or a combination thereof, to form an activated layer on the surface of the substrate; packing the substrate in a powder mixture containing a permeated master metal, an activator, and filler powder; and heat-treating the packing to allow the permeated master metal to diffuse into the activated layer and then to form a surface modification coating. The permeation rate of the permeated master metal can be increased due to the activated layer having a high defect concentration. Hence, it is possible to prepare a surface modification coating at a low temperature. The surface modification coating of the present invention can also decrease the interface contact resistance between the bipolar plates and gas diffusion layers.

9 Claims, 11 Drawing Sheets

METHOD FOR PREPARING SURFACE MODIFICATION COATING OF METAL BIPOLAR PLATES

BACKGROUND OF THE INVENTION

1. Field of the Invention

The present invention relates to a method for preparing a surface modification coating of metal bipolar plates. More particularly, the method is carried out by a combination of surface-activation techniques and low-temperature pack cementation to prepare metal bipolar plates suitable for fuel cells or appropriately applied as end plates for fuel cell stacks.

2. Description of Related Art

In recent years, substrates made of graphite have been generally used as bipolar plates in proton exchange membrane fuel cells (PEMFC). These graphite plates on which parallel or various shaped flow-field patterns are made by a milling machine, possess high corrosion resistance and good electrical conductivity. However, they have drawbacks, such as being difficult to be processed, brittle, expensive, bulky, and heavy, and thus can not be applied in mass production.

Therefore, cheap metal substrates are suggested to substitute expensive graphite bipolar plates so that costs can be dramatically lowered. Nevertheless, metal bipolar plates are exposed in a corrosive environment during operation of PEMFC, and a few cations are dissolved into produced water. The corrosion phenomena will result in deteriorated performance of fuel cells.

In general, surface modification coatings of metal bipolar plates can be prepared by physical vapor deposition (PVD), chemical vapor deposition (CVD), or thermo reactive deposition (such as pack cementation). Among them, the physical vapor deposition has shortcomings of, for example, requiring expensive equipment and complex steps. Besides, formed coatings have low adhesion to the plates under restrictions of deposition temperature. In the chemical vapor deposition, desired compounds can be deposited on a substrate heated to promote a reaction between the substrate and chemical reactants. Hence, the depositing temperature and the manufacturing cost of this process are relatively high, and the high-temperature process is easy to incur the deformation of substrate. Accordingly, both PVD and CVD processes do not satisfy the demand of economic mass production.

Traditional pack cementation is performed at a high temperature of 800-1200° C., and elements Cr, V, Ti, etc. permeate into substrates to form coatings containing compounds such as carbides, nitrides, and borides. The pack cementation is particularly suitable for carbon-containing steel substrates, and it is advantageous in low costs of equipment and preparing uniform surface modification coatings on complex-shaped workpieces. Notwithstanding, this process does satisfy the industry demand of economic mass production because the high-temperature operation of traditional pack cementation would cause phase transformation, deformation, and deterioration of steel substrates.

As a result, there is an urgent need to provide a new technique cooperating with pack cementation so as to solve the problems that the thickness of metal bipolar plates has gradually decreased and graphite bipolar plates are not suitable in the future.

SUMMARY OF THE INVENTION

The object of the present invention is to provide a method for preparing a surface modification coating of metal bipolar plates by surface-activation techniques and low-temperature pack cementation so as to reduce a process temperature. Thus, a surface modification coating which has small thickness, good coverage, and excellent adhesion to a substrate can be produced for preparation of metal bipolar plates.

To achieve the object, the present invention provides a method for preparing a surface modification coating of metal bipolar plates. In the method, the surface of the substrate is activated and then chromized by pack cementation so that the surface modification coating of metal bipolar plates can be prepared. Hence, the method of the present invention comprises the following steps: (A) providing a substrate; (B) pre-treating the substrate by substrate processing (e.g. electrical discharge machining, sand blasting, rolling, and punching), depositing a Ni-layer on the substrate, or a combination thereof, to form an activated layer on the surface of the substrate; (C) packing the substrate in a powder mixture, wherein the powder mixture comprises permeated master metal, an activator, and filler powder; and (D) heat-treating the powder mixture and the substrate packed therein to make the permeated master metal diffuse to the activated layer so as to form a surface modification coating.

In the abovementioned method, the surfaces of the metal bipolar plates are activated by pretreatment (step (B)) and then processed by pack cementation (step (D)) so as to carry out modification thereon. Thus, a chromized surface modification coating having both good corrosion resistance and low contact resistance can be obtained. Herein, the activated layer having high defect concentration is formed on the surfaces of the substrate by pre-treating the substrate, thereby promoting the adhesion of the permeated master metal to the substrate and lowering the temperature of the subsequent pack cementation. In a traditional method for preparing a surface modification coating of metal bipolar plates, pack cementation is performed on surfaces of an inactivated substrate, and thus, the pack cementation needs to be heated to a temperature of 800 to 1200° C. By contrast, the preferred surface modification coating can be obtained at a much lower temperature in the method of the present invention since the activated layer having high defect concentration is formed on the surfaces of the substrate first.

In one aspect of the present invention, the surfaces of the substrate in the step (B) of the method are roughened by electrical discharge machining, sand blasting, rolling, or punching to perform the pretreatment. Through the pretreatment of the electrical discharge machining or the sand blasting, the surfaces of the substrate exhibit rough microstructures which contain a large amount of voids, dislocations, grain boundaries, and plastic deformation zones and extremely high residual stress. Thus, the surfaces of the metal bipolar plates can be activated owing to very high surface energy thereof.

In the electrical discharge machining, the substrate is processed by a pulse discharge current to form the activated layer. The discharge current is not particularly limited, but preferably is in a range of 1 A to 10 A, and more preferably in a range of 1 A to 2 A.

In the sand blasting, the substrate is processed by various-sized sand particles and different blasting pressures so as to form the activated layer. The size of the sand particles is not limited, but preferably is in a range of 50 to 300 meshes and more preferably in a range of 100 to 200 meshes.

In another aspect of the present invention, the surfaces of the substrate in the step (B) of the method are coated with a Ni-layer so as to form the activated layer thereon. The activated layer is a Ni-layer which has a high defect concentration containing a large amount of grain boundaries, dislocations, voids, etc. Since Ni has a good miscibility with the permeated master metal (e.g. Cr) used in the pack cementation, using the Ni-layer as the activated layer prior to the chromization of the pack cementation can promote the deposition of the permeated master metal to lower a temperature of the process.

In still another aspect of the present invention, a Ni-layer can be deposited on the substrate surfaces after the substrates are pre-treated by the electrical discharge machining or the sand blasting (step (B)). If the rough microstructures are produced on the substrate surfaces by the electrical discharge machining or the sand blasting, an extremely high surface energy also occurs thereon. After that, the Ni-layer is deposited on the substrate surfaces to give the activated layer having a much higher defect concentration.

In the method of the present invention, the substrate can be made of any metal materials, but preferably is made of an iron-based alloy containing carbon and more preferably is made of carbon steels. The carbon amount in the alloy is various.

In the step (C) of the method of the present invention, the powder mixture is put in a crucible, and then the substrate is packed in the powder mixture. The substrates are completely encompassed by the powder mixture.

In the step (D) of the method of the present invention, the crucible containing the powder mixture and the substrate is arranged in a vacuum heat treatment furnace and then a heat treatment is carried out. The heat treatment is performed under vacuum, or under an ambient or protective atmosphere (e.g. an atmosphere of argon or nitrogen). In addition, the temperature of the heat treatment is not particularly limited, but preferably is in a range of 400 to 800° C. and more preferably in a range of 500 to 700° C. Since the phase transformation temperature of carbon steels is 723° C., the heat-treatment temperature of the present invention is required to be lower than 700° C. to avoid the deformation of bipolar plates, which are made of the iron-based alloy in the pack cementation of the step (D).

In the method of the present invention, the permeated master metal can be Cr or a Cr-alloy, the activator can be a halide (e.g. $NH_4Cl$), and the filler powder can be $Al_2O_3$. The crucible used in the pack cementation can be an aluminum oxide crucible.

Furthermore, in the method of the present invention, each component of the powder mixture is not limited in a particular amount. Preferably, a content of the permeated master metal is 5 to 30% by weight based on a total amount of the powder mixture, a content of the activator is 1 to 10% by weight based on a total amount of the powder mixture, and a content of the filler powder is 60 to 94% by weight based on a total amount of the powder mixture. More particularly, the content of the permeated master metal is 20 to 25% by weight based on a total amount of the powder mixture, the content of the activator is 4 to 8% by weight based on a total amount of the powder mixture, and the content of the filler powder is 67 to 71% by weight based on a total amount of the powder mixture.

In the method of the present invention, a thickness of the surface modification coating can be in a range of 1 to 4 µm. The surface modification coating can be made of chromium-iron carbide, chromium-iron nitride, or a combination thereof. Preferably, the surface modification coating is made of $(Cr,Fe)_7C_3$, $(Cr,Fe)_{23}C_6$, $(Cr,Fe)_2N_{1-x}$, or a combination thereof, wherein X is in a range of 0 to 1.

The method of the present invention is suitable for any technical field. Preferably, the method of the present invention is appropriate for preparation of metal bipolar plates for fuel cells or end plates for fuel cell stacks.

In conclusion, the present invention provides three methods of forming the activated layer as follows: (1) increasing the driving force of solid diffusion in heat treatment by surface activation of processing (i.e. electrical discharge machining, sand blasting, rolling, or punching); (2) promoting the permeation result of master metals by depositing a Ni-layer with high concentration of defects, because the permeated master metal and the Ni layer are miscible; and (3) a combination of the above-mentioned (1) and (2) to render the substrate surfaces much more activated. Therefore, surface activation can be directly executed on various types of iron-based substrates by processing or depositing a Ni-layer in the method of the present invention. Thus, much better surface modification can be obtained by pack cementation at a relatively low temperature. Moreover, by contrast to a traditional method where pack cementation performed on inactivated substrate requires heating to a high temperature of 800 to 1200° C., the method of the present invention can improve a problem of adhesion between the permeated coating and the substrate by pre-depositing the Ni-layer on the substrate.

Besides, the present invention can combine surface activation and the formation of flow-field pattern in one procedure, and carry out the pack cementation at 400 to 800° C. to ensure that the metal bipolar plate does not deform during heat treatment. Likewise, a Cr-rich layer consisting of chromium carbide and chromium nitride can be obtained in the preparation of the present invention. Thus, it is possible to efficiently advance corrosion resistance of the substrate and reduce contact resistance between the bipolar plates and gas diffusion layers.

Other objects, advantages, and novel features of the invention will become more apparent from the following detailed description when taken in conjunction with the accompanying drawings.

DETAILED DESCRIPTION OF THE PREFERRED EMBODIMENT

The present invention provides three methods of forming an activated layer on substrates for preparing a surface modification coating of metal bipolar plates.

Figure 1:
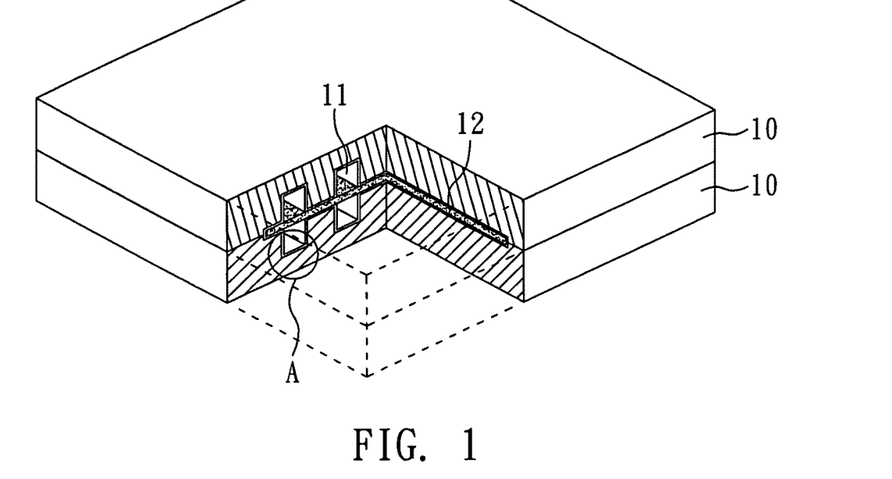
FIG. 1 is a perspective view of a fuel cell in the present invention.

First, as shown in FIG. 1, there is a perspective view of a fuel cell. On bipolar plates 10 of a common fuel cell, multiple flow channels 11 are arranged to provide space for gas reacted with a membrane electrode assembly 12. The bipolar plates 10 are metal bipolar plates, for example iron-based bipolar plates.

Figure 2:
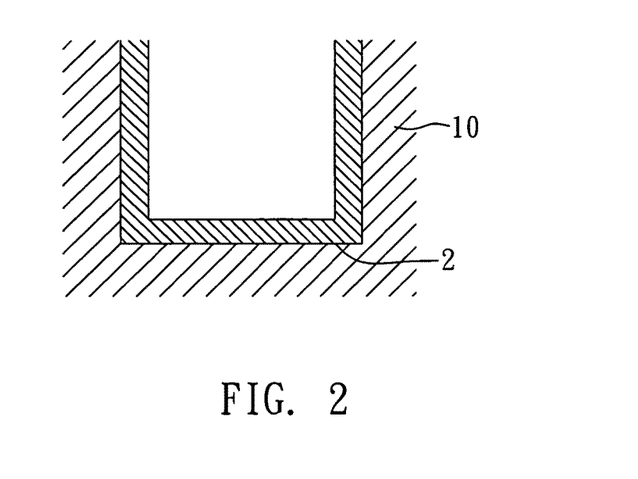
FIG. 2 is a perspective view of a surface modification coating on a bipolar plate of the fuel cell in the present invention.

Subsequently, with reference to FIG. 2, there is an amplified view of zone A in FIG. 1. FIG. 2 shows a surface modification coating of the bipolar plates in the fuel cell of the present invention. On the surfaces of the bipolar plates 10 (substrates), a surface modification coating 2 is formed, and a thickness thereof is in a range of 1 to 4 μm.

Hereinafter, the method of preparing the surface modification coating of the metal bipolar plates in the present invention is illustrated in detail. The present invention provides three kinds of surface pretreatment and pack cementation processes to form surface modification coatings on the bipolar plate.

Example 1

Processing the Substrate and Pack Cementation

Figure 3:
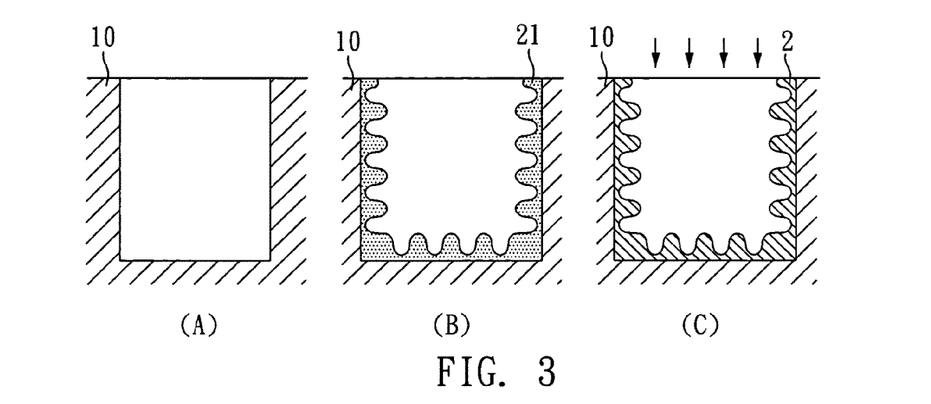
FIGS. 3A to 3C show a flowchart for preparing a surface modification coating in Example 1 of the present invention.

First, a substrate 10 is provided (see FIG. 3A). The substrate 10 is processed by electrical discharge machining, sand blasting, punching or rolling. Thus, surfaces of the substrate 10 are roughened to form an activated layer 21 (see FIG. 3B). Herein, the activated layer has various complex structural defects, and therefore the surfaces of the substrate 10 with the activated layer 21 exhibit extremely high surface energy.

Then, pack cementation is carried out on the substrate 10 having the activated layer 21 to form a surface modification coating 2 (see FIG. 3C).

Example 2

Depositing a Ni-Layer on the Substrate and Pack Cementation

Figure 4:
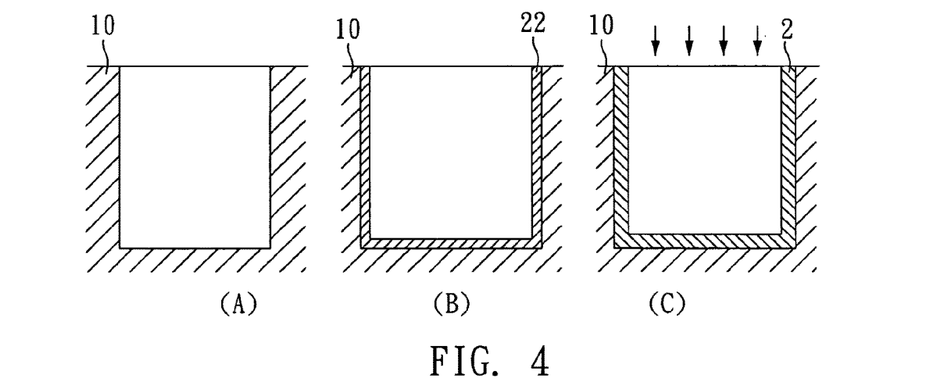
FIGS. 4A to 4C show a flowchart for preparing a surface modification coating in Example 2 of the present invention.

First, a substrate 10 is provided (see FIG. 4A). A Ni-layer 22 is deposited on surfaces of the substrate 10 (see FIG. 4B). The Ni-layer 22 contains many defects such as dislocations, grain boundaries, and voids. In addition, the permeated master metal has a good miscibility to Ni. The pack-cementation temperature can be lowered by depositing such a Ni-layer on the substrate.

Then, pack cementation is carried out on the substrate 10 with the Ni-layer 22 to form a surface modification coating 2 (see FIG. 4C).

Example 3

Figure 5:
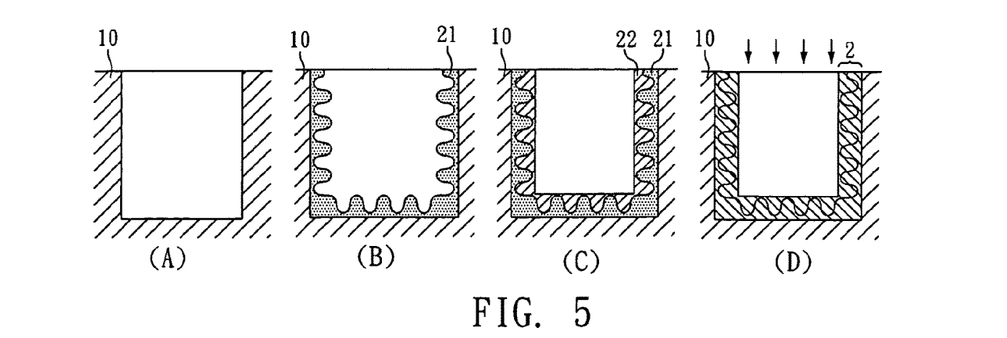
FIGS. 5A to 5D show a flowchart for preparing a surface modification coating in Example 3 of the present invention.

Processing of Substrate Surfaces, Coating of a Ni-Layer on the Substrate Surfaces and Pack Cementation First, a substrate 10 is provided (see FIG. 5A). The substrate 10 is processed by electrical discharge machining, sand blasting, punching or rolling. Thus, surfaces of the substrate 10 are roughened to form an activated layer 21 (see FIG. 5B). After that, a Ni-layer 22 is deposited on surfaces of the substrate 10 (see FIG. 5C). Since the activated layer 21 and the Ni-layer 22 are on the surfaces of the substrate 10, the pack-cementation temperature can be reduced via surface energy promoted by the various complex structural defects in the activated layer 21 and via good miscibility of the permeated master metal to the Ni-layer 22.

Then, pack cementation is carried out on the substrate 10 with the activated layer 21 and the Ni-layer 22 to form a surface modification coating 2 (see FIG. 5D).

Herein, there are exemplified several Test Examples for illustration of the method for preparing the surface modification coating on the bipolar plates in the present invention.

Comparative Example 1

Figure 6:
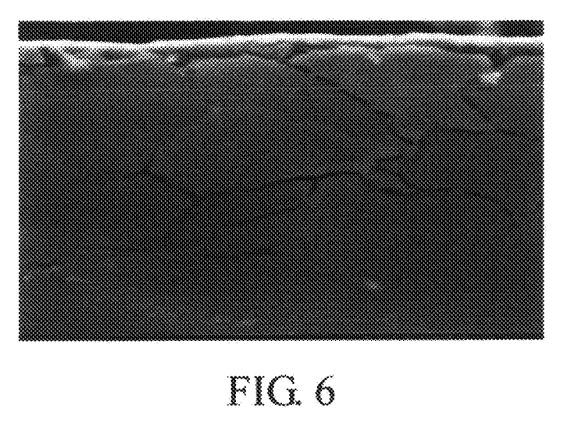
FIG. 6 is a photomicrograph of scanning electron microscopy (SEM) of a chromized coating in Comparative Example 1 of the present invention (WD 22.7 mm, 15.0 kV, ×7.0 k, scale: 5 µm)

Chromized Coating Afforded by Pack Cementation on Non-Activated AISI 1020 Low-Carbon Steel AISI 1020 low-carbon steel is finished with silicon sandpaper to #2400, washed by deionized water, dried by nitrogen, and then packed in an aluminum oxide crucible with a powder mixture containing 25% chromium powders, 4% $NH_4Cl$ powders, and 71% $Al_2O_3$ powders. The crucible is put in a furnace for pack cementation for 2 hours, where the vacuum is $10^{-3}$ torr to prevent oxidation of the specimen during the pack cementation, the heating rate is 10° C./min, and the operational temperature is 700° C. so as to form a chromized coating on the substrate. A result is examined by SEM as shown in FIG. 6. In the result, a chromized coating having an uneven thickness and local defects is formed on the AISI 1020 low-carbon steel since the driving force for permeation is not sufficient at low-temperature pack cementation without surface activation. The thickness of the chromized coating is about 1 μm.

Test Example 1

Chromized Coating Afforded by Pack Cementation on AISI 1020 Low-Carbon Steel Activated by Electrical Discharge Machining (10 A)

Figure 7:
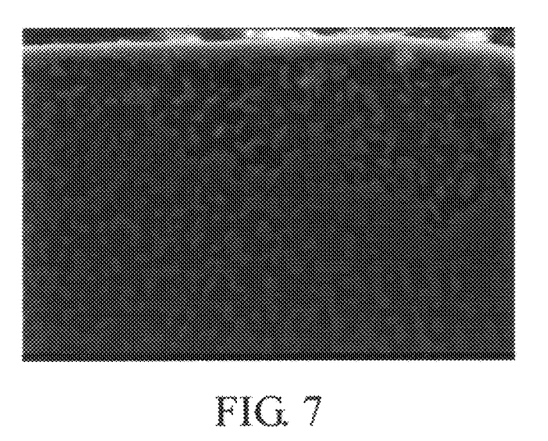
FIG. 7 is an SEM photomicrograph of a chromized coating in Test Example 1 of the present invention (WD 25.9 mm, 15.0 kV, ×7.0 k, scale: 5 µm)

AISI 1020 Low-Carbon Steel is Processed by Electrical Discharge machining (10 A) to form an activated layer, and then by pack cementation with the same parameters of Comparative Example 1. A result is obtained by SEM as shown in FIG. 7. In the result, the thickness of chromized coating is uniform and there is no defect in the chromized coating. This result indicates that the diffusion driving force of chromium can be efficiently increased by the surface activation treatment of electrical discharge machining and thus the thickness of this chromized coating is continuous and uniform. However, relatively high discharge current produces a thick recast layer, and a large amount of chromium diffuses into inner parts of the recast layer and then chromium-iron carbides or chromium-iron compounds precipitate in structural defects of the recast layer. Thus, the thickness of continuous chromized coating is not greatly increased and the thickness thereof is about 1 μm.

Test Example 2

Chromized Coating Afforded by Pack Cementation on AISI 1020 Low-Carbon Steel Activated by Electrical Discharge Machining (2 A)

Figure 8:
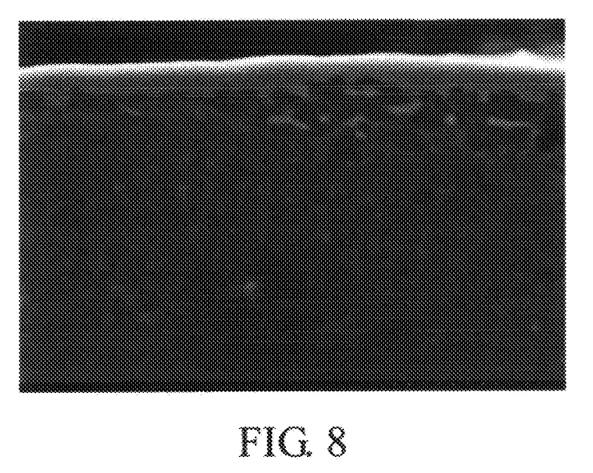
FIG. 8 is an SEM photomicrograph of a chromized coating in Test Example 2 of the present invention (WD 25.7 mm, 15.0 kV, ×7.0 k, scale: 5 µm)

This example shows different electrical discharge currents can influence the thickness of the coating. In this example, the steps are the same as Test Example 1 except the electrical discharge current is reduced to 2 A. A result is obtained by SEM as shown in FIG. 8. In the result, the problem mentioned in Test Example 1 (i.e. the thickness of the coating cannot be increased) is solved. This result explains that the low discharge current (2 A) produces a relatively thin recast layer on the substrate. Thus, chromium diffusing into the recast layer is most expended in forming a chromized coating. The thickness of continuous chromized coating is effectively increased and the thickness thereof is about 1.5

Test Example 3

Figure 9:
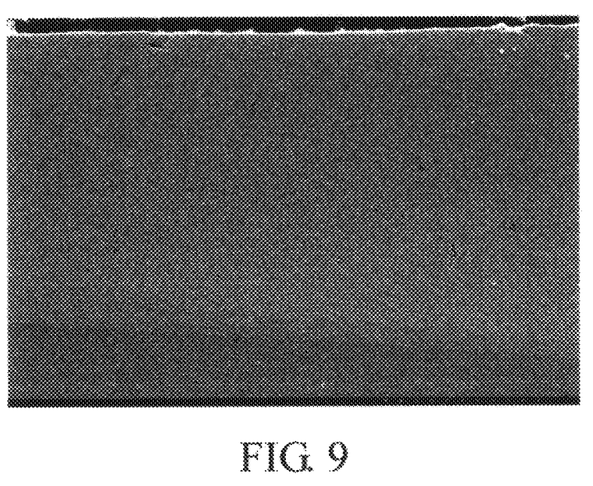
FIG. 9 is an SEM photomicrograph of a chromized coating in Test Example 3 of the present invention (WD 25.8 mm, 15.0 kV, ×700, scale: 50 µm)
Figure 10:
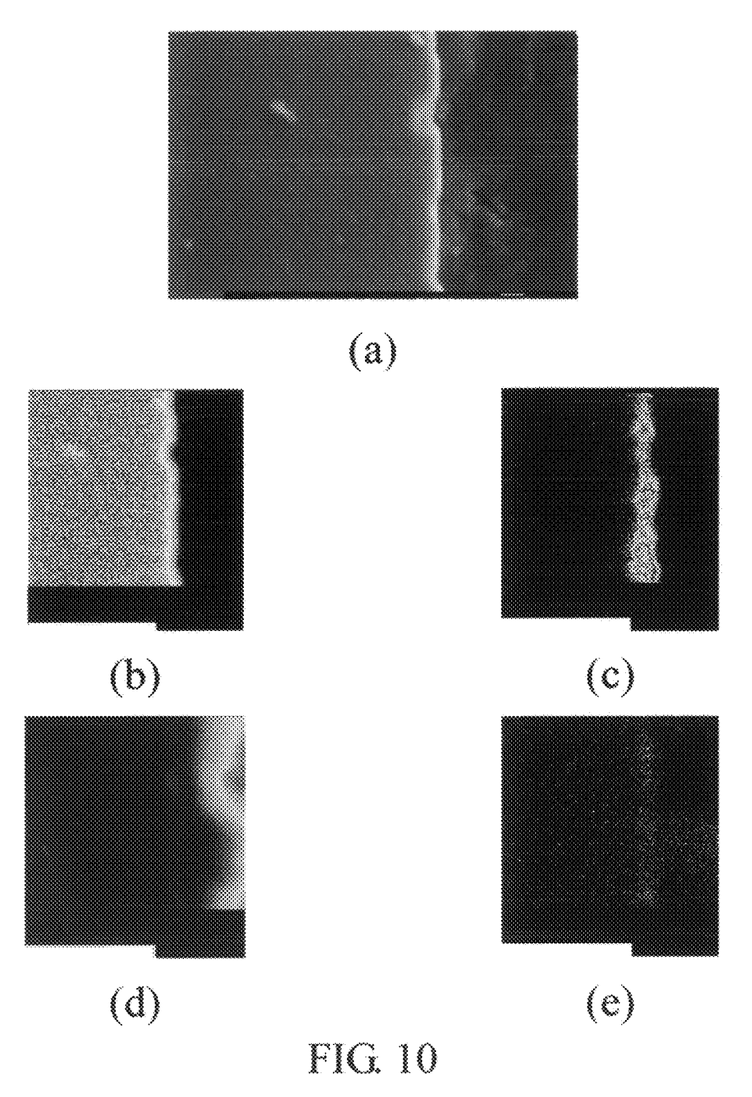
FIG. 10 shows electron probe microanalysis (EPMA) photomicrographs of the chromized coating where (a) is a secondary electron imaging (SEI) photomicrograph (WD 11 mm, 15.0 kV, ×7,000, scale: 1 µm), and (b) to (e) respectively are X-ray maps of Ni, Cr, C, and Fe in Test Example 3 of the present invention (scale: 2 µm)

Chromized Coating Afforded by Pack Cementation on AISI 1020 Low-Carbon Steel Activated by a Pre-Depositing Ni-Layer An activated Ni-layer was pre-deposited and then the pack cementation was carried out on AISI 1020 low-carbon steel. The parameters of the pack cementation are according to Test Example 1. Results are obtained by SEM and EPMA as shown in FIGS. 9 and 10. In the results, C, Cr, and Fe are solved in the Ni-layer in form of solid solution. Partial C, Cr, and Fe are transformed into carbides and they are distributed on an outside of the Ni-layer to form the chromized coating. The coating is successive, compact, and uniform, and serious defects are not found therein. The coating contains large amounts of Cr with reference to EPMA analyses and is of the thickness about 2

Test Example 4

Figure 11:
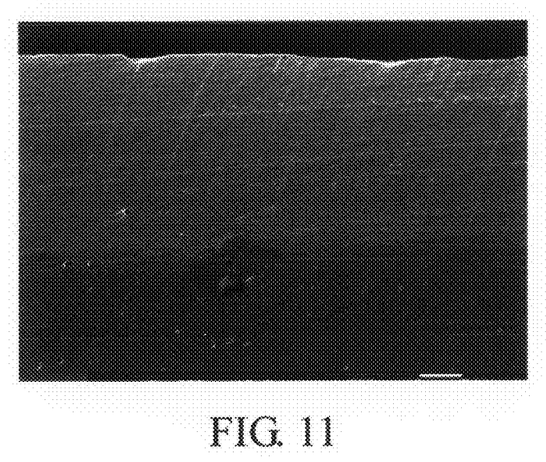
FIG. 11 is an SEM photomicrograph of a chromized coating in Test Example 4 of the present invention (WD 11 mm, 15.0 kV, ×1,000, scale: 10 μm)
Figure 12:
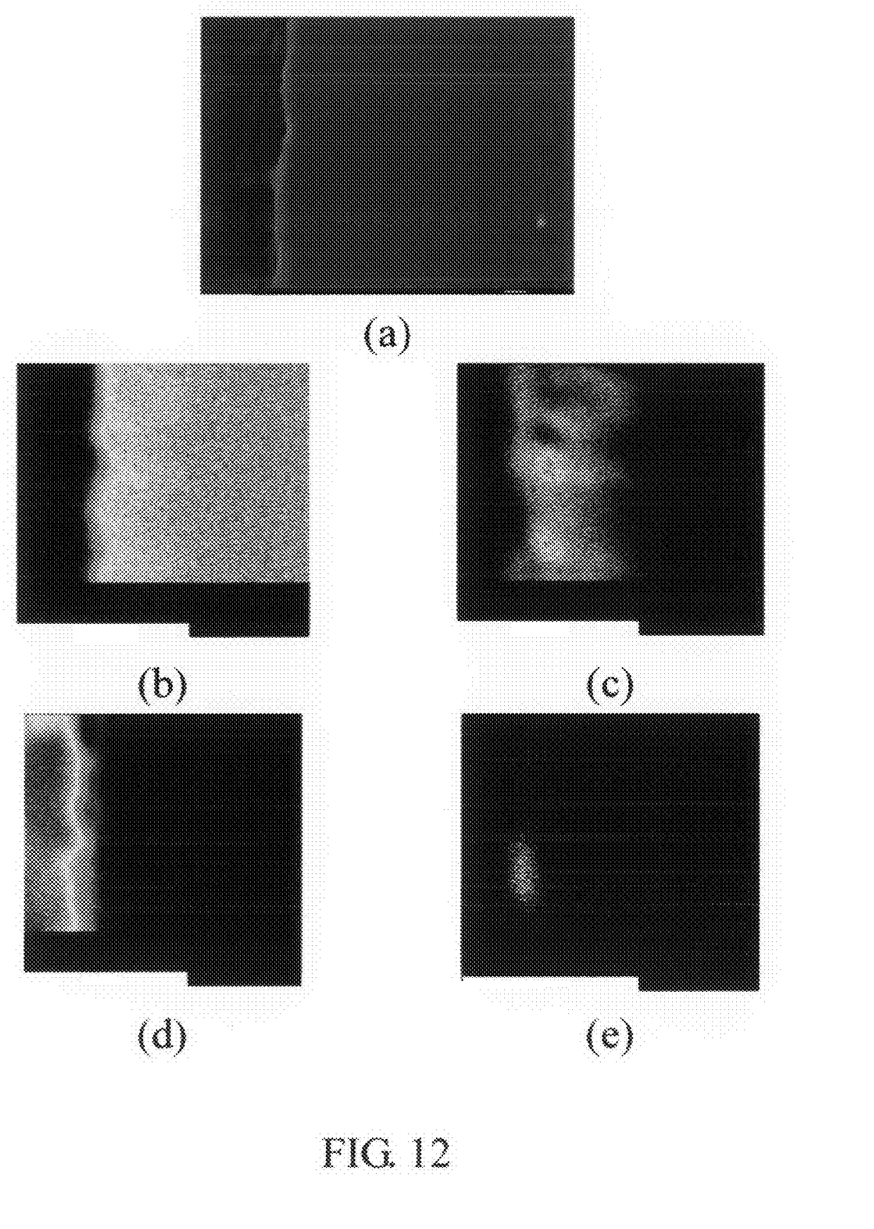
FIG. 12 shows EPMA photomicrographs of the chromized coating where (a) is an SEI photomicrograph (WD 11 mm, 15.0 kV, ×7,000, scale: 1 μm), and (b) to (e) respectively are X-ray maps of Ni, Cr, C, and Fe in Test Example 4 of the present invention (scale: 2 μm)

Chromized Coating Afforded by Pack Cementation on AISI 1020 Low-Carbon Steel Activated by Electrical Discharge Machining (2 A) and a Ni-Layer AISI 1020 low-carbon steel is processed by electrical discharge machining (2 A) to form an activated layer, and then a Ni-layer is deposited on the activated layer given by electrical discharge machining. Thus, the resultant activated layer on the substrate surfaces contains both advantages of the electrical discharge machining and the Ni-layer. The parameters of the pack cementation are according to Test Example 1. Results are obtained by SEM and EPMA as shown in FIGS. 11 and 12. C, Cr, and Fe are uniformly distributed in the coating. Partial C, Cr, and Fe are transformed into carbides and they are distributed on an outside of the coating. The coating contains large amounts of Cr with reference to EPMA analyses and is of the thickness about 4 μm. These results show that the electrical discharge machining and the Ni-layer are advantageous in surface activation, thereby increasing the efficiency of Cr permeation and also thickening the chromized coating. Based on FIG. 12, the coating is successive, compact and uniform but a small amount of Fe is contained in the coating.

Test Example 5

Figure 13:
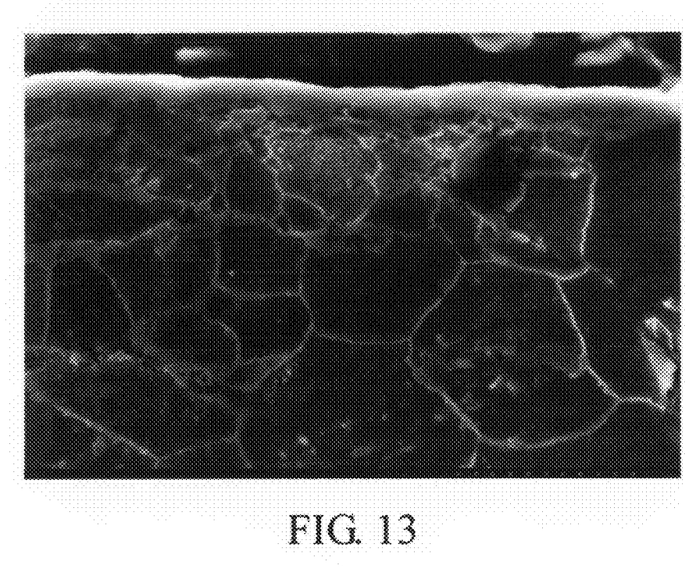
FIG. 13 is an SEM photomicrograph of a chromized coating in Test Example 5 of the present invention (WD 16.2 mm, 15.0 kV, ×7,000, scale: 5 μm)

Chromized Coating Afforded by Pack Cementation on AISI 1020 Low-Carbon Steel Activated by Sand Blasting AISI 1020 low-carbon steel is processed by sand blasting with 120 meshes sand particles to form an activated layer, and then by pack cementation with the same parameters of Comparative Example 1. A result is obtained by SEM as shown in FIG. 13. In the result, the thickness of chromized coating is uniform and there is no defect in the chromized coating. This result indicates that the diffusion driving force of chromium can be efficiently increased by the surface activation treatment of sandblast and thus the thickness of this chromized coating is continuous and uniform. However, a large amount of chromium diffuses into inner parts of the substrate and then chromium-iron carbides or chromium-iron compounds precipitate in structural defects and grain boundaries. Thus, the thickness of continuous chromized coating is not greatly increased and the thickness thereof is about 1 μm.

Figure 14:
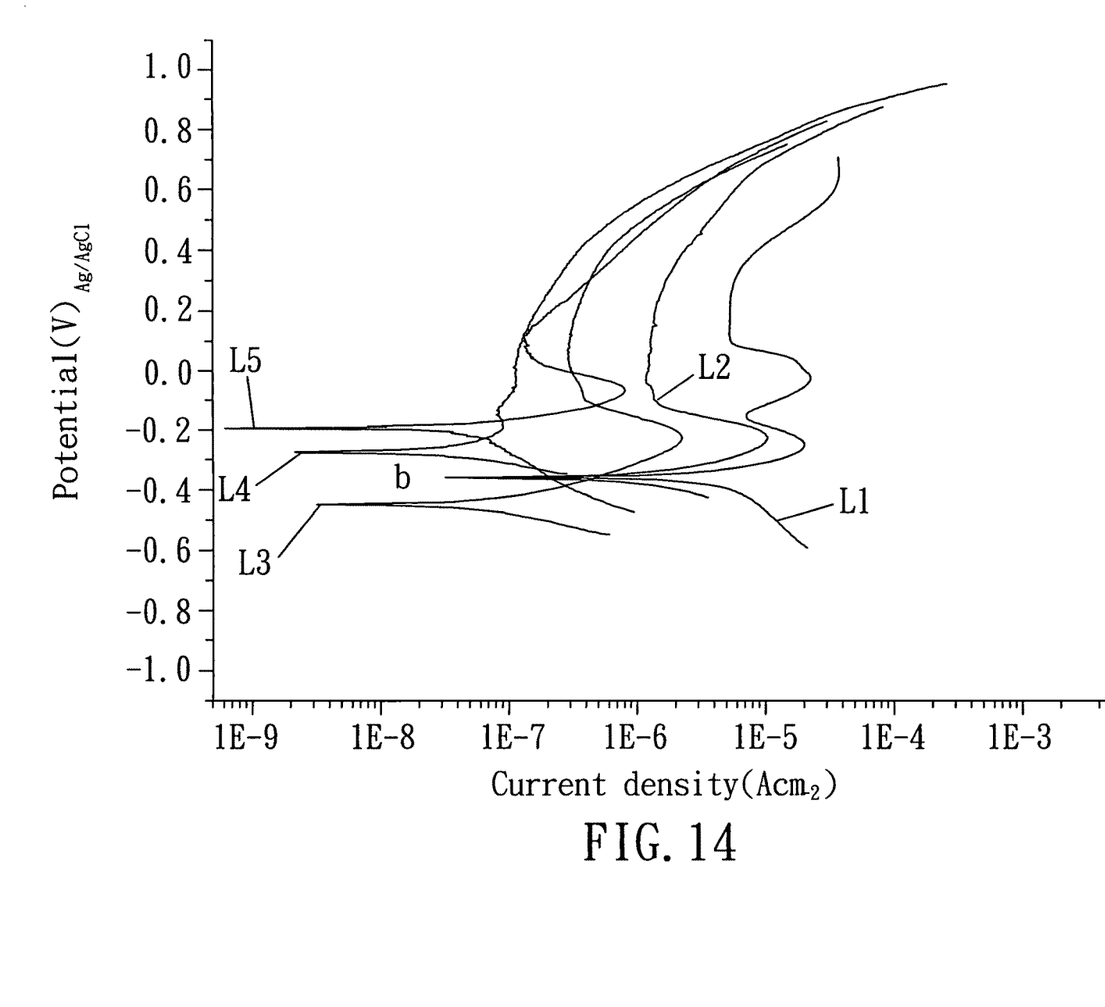
FIG. 14 is a polarization curve of the chromized coatings in Test Examples 1 to 4 and Comparative Example 1 of the present invention.

In order to investigate the capability of abovementioned bipolar plates undergoing an acidic environment of a fuel cell, those prepared in Comparative Example 1 and Test Examples 1 to 4 are analyzed in a simulated environment of a PEMFC fuel cell (0.5 M $H_2SO_4$ electrolyte at 25° C.) by a potentiodynamic polarization test. A polarization curve (L1) of Comparative Example 1 and polarization curves (L2 to L5) of Test Examples 1 to 4 are contrasted as shown in FIG. 14. In addition, corrosion currents ($I_{corr}$) and corrosion potentials ($E_{corr}$) are obtained by Tafel extrapolation as shown in Table 1.

TABLE 1

| Example | Chromization temperature | Type of the activated layer | Icorr (A/cm$^2$) | Ecorr (V) |
|---|---|---|---|---|
| Comparative Example 1 | 700° C. | None | 1.24E−06 | −0.357 |
| Test Example 1 | 700° C. | Electrical discharge machining (10A) | 5.76E−07 | −0.368 |
| Test Example 2 | 700° C. | Electrical discharge machining (2A) | 5.78E−08 | −0.448 |
| Test Example 3 | 700° C. | Ni layer | 2.34E−08 | −0.275 |
| Test Example 4 | 700° C. | Electrical discharge machining (2A) + Ni layer | 2.16E−08 | −0.199 |

With reference to the corrosion test results in Table 1, it can be seen that the corrosion currents of the activated and pack-cementation bipolar plates are obviously lower than that of simple pack-cementation (non-activated) bipolar plates.

Figure 15:
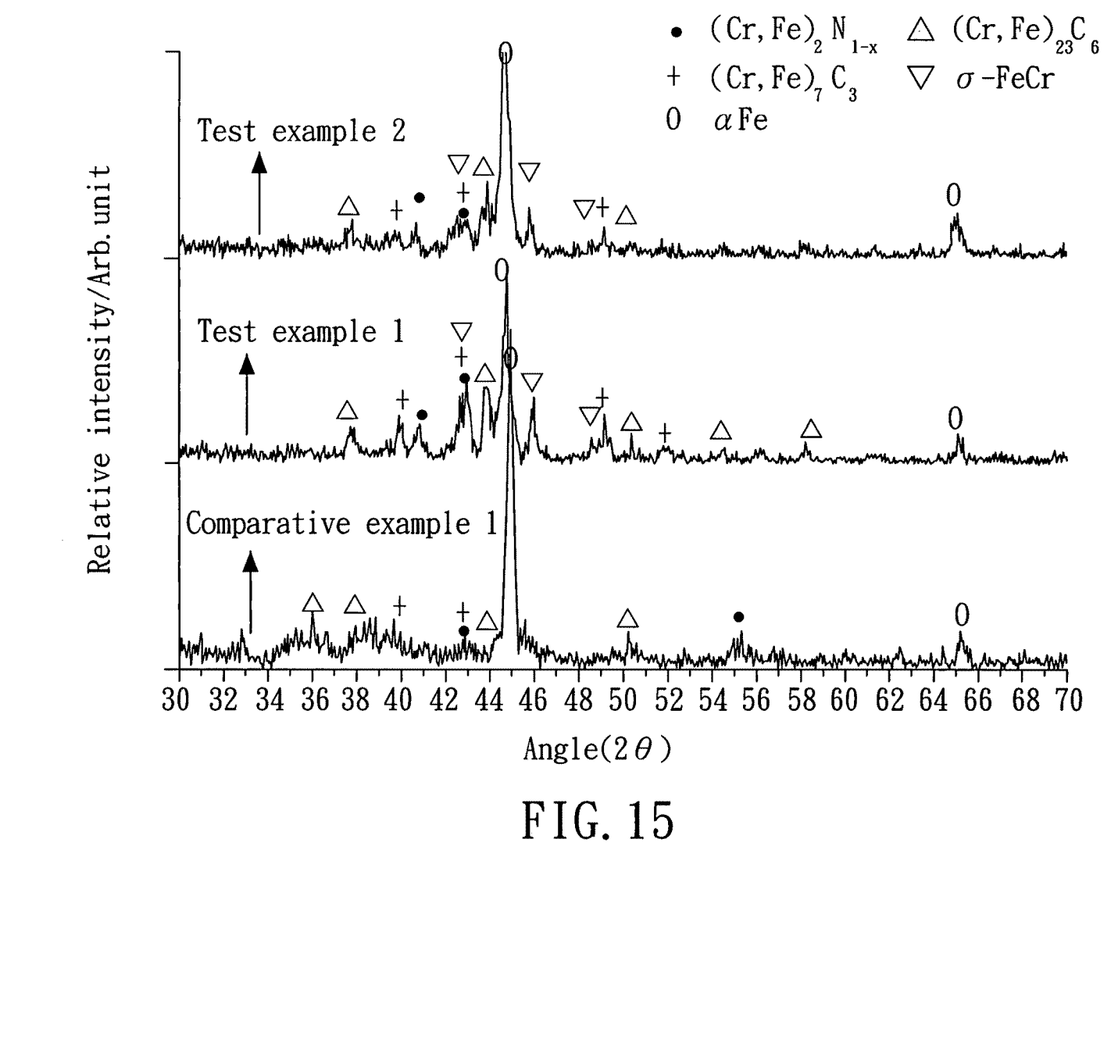
FIG. 15 is an X-ray diffraction graph of the chromized coatings in Test Examples 1 to 2 and Comparative Example 1 of the present invention.
Figure 16:
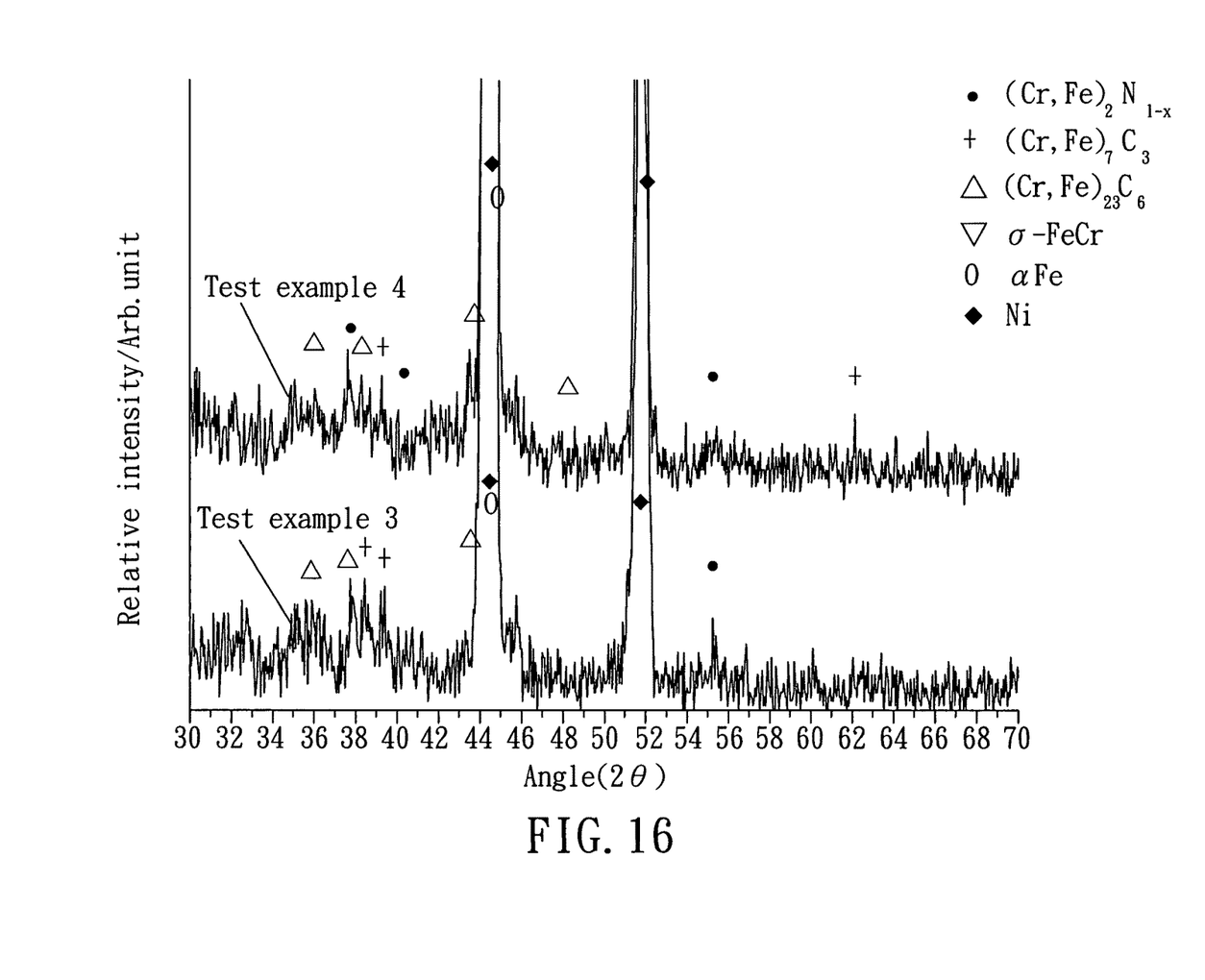
FIG. 16 is an X-ray diffraction graph of the chromized coatings in Test Examples 3 and 4 of the present invention.

Besides, X-ray diffraction analyses of Comparative Example 1 and Test Examples 1 and 2 are shown in FIG. 15, and those of Test Examples 3 and 4 are shown in FIG. 16, in which:

Comparative Example 1: $(Cr,Fe)_7C_3$ and $(Cr,Fe)_{23}C_6$ are major constituents and $(Cr,Fe)_2N_{1-x}$ is a minor constituent in the coating;

Test Examples 1 and 2: $(Cr,Fe)_7C_3$, σ-FeCr and $(Cr,Fe)_{23}C_6$ are major constituents and $(Cr,Fe)_2N_1$, is a minor constituent in the coating; and Test Examples 3 and 4: Ni, $(Cr,Fe)_7C_3$ and $(Cr,Fe)_{23}C_6$ are major constituents and $(Cr,Fe)_2N_{1-x}$ is a minor constituent in the coating.

After the elemental analyses, the elemental compositions of the coatings in Comparative Example 1 and Test Examples 1 to 4 are shown in Table 2. Accordingly, the coatings prepared by surface-activation and pack-cementation possess a relatively high Cr amount and a lowered Fe amount to make corrosion resistance better.

TABLE 2

| Example | C | Cr | Fe | Ni | N | O |
|---|---|---|---|---|---|---|
| Comparative Example 1 | 24.87 | 33.96 | 2.20 | * | 15.22 | 23.73 |
| Test Example 1 | 21.42 | 29.94 | 1.45 | * | 14.67 | 32.5 |
| Test Example 2 | 20.17 | 43.33 | 2.46 | * | 24.99 | 9.02 |
| Test Example 3 | 8.10 | 32.9 | 0.95 | 24.13 | 24.81 | 9.08 |
| Test Example 4 | 4.84 | 36.66 | 0.49 | 1.31 | 14.36 | 42.31 |

Although the present invention has been explained in relation to its preferred embodiment, it is to be understood that many other possible modifications and variations can be made without departing from the scope of the invention as hereinafter claimed.

What is claimed is:

1. A method for preparing a surface modification coating of metal bipolar plates, comprising the following steps:
    (A) providing a substrate, wherein the substrate is an iron-based alloy;
    (B) pre-treating the substrate by substrate processing, depositing a Ni-layer on the substrate, or a combination thereof, to form a defective activated layer on the surface of the substrate; wherein the defective activated layer by means of depositing a Ni-layer on the substrate has a high defect concentration containing a large amount of grain boundaries, dislocations, voids; wherein the defective activated layer by means of the substrate processing exhibit rough microstructures which contain a large amount of voids, dislocations, grain boundaries, and plastic deformation zones and extremely high residual stress;
    (C) packing the substrate in a powder mixture, wherein the powder mixture comprises a permeated master metal, an activator, and filler powder; wherein the permeated master metal is Cr or a Cr-alloy, and
    (D) heat-treating the powder mixture and the substrate packed therein to make the permeated master metal diffuse to the defective activated layer so as to form a surface modification coating, wherein the surface modification coating is made of chromium-iron carbides, chromium-iron nitrides, or a combination thereof.

2. The method as claimed in claim 1, wherein the substrate processing in the step (B) is electrical discharge machining, sand blasting, rolling, or punching.

3. The method as claimed in claim 2, wherein a discharge current applied in the electrical discharge machining is in a range of 1 A to 10 A.

4. The method as claimed in claim 2, wherein a size of sand particles used in sand blasting is in a range of 50 to 300 meshes.

5. The method as claimed in claim 1, wherein the activator is a halide.

6. The method as claimed in claim 1, wherein a content of the permeated master metal is 5 to 30% by weight based on a total amount of the powder mixture.

7. The method as claimed in claim 1, wherein a content of the activator is 1 to 10% by weight based on a total amount of the powder mixture.

8. The method as claimed in claim 1, wherein a temperature of the heat-treatment in the step (D) is in a range of 400 to 800° C.

9. The method as claimed in claim 1, wherein the heat-treatment in the step (D) is performed under vacuum, or an ambient or protective atmosphere.

* * * * *